Aug. 29, 1939.   S. E. ADAMS   2,170,983
TRAILER HITCH
Filed April 2, 1938   2 Sheets-Sheet 2
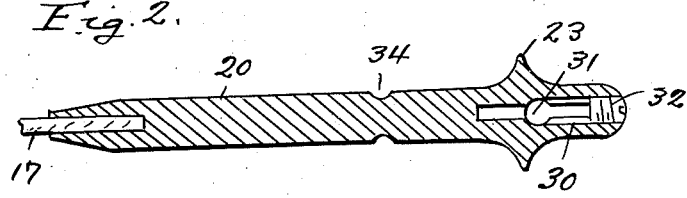
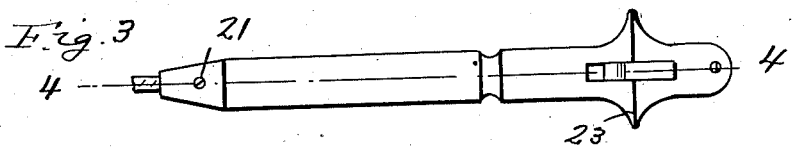
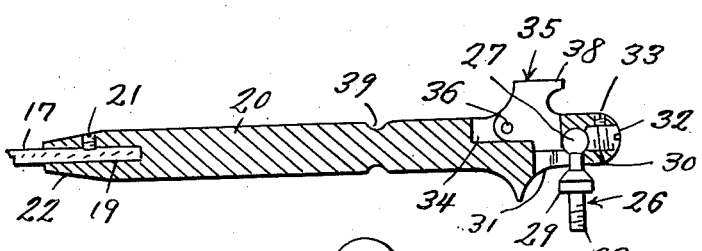
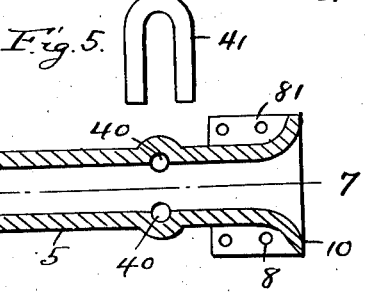
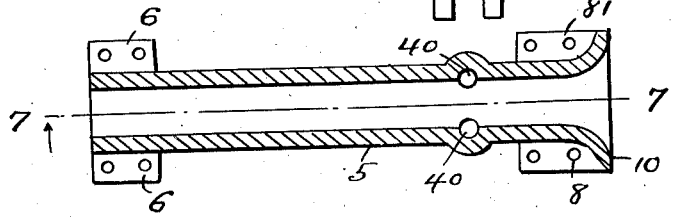
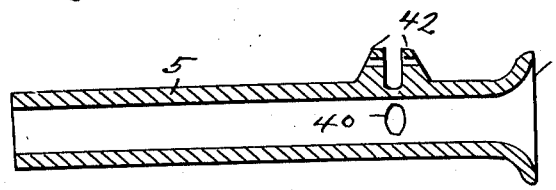
Inventor
Schalto Edward Adams
By Clarence A. O'Brien
and Hyman Berman.
Attorneys Patented Aug. 29, 1939

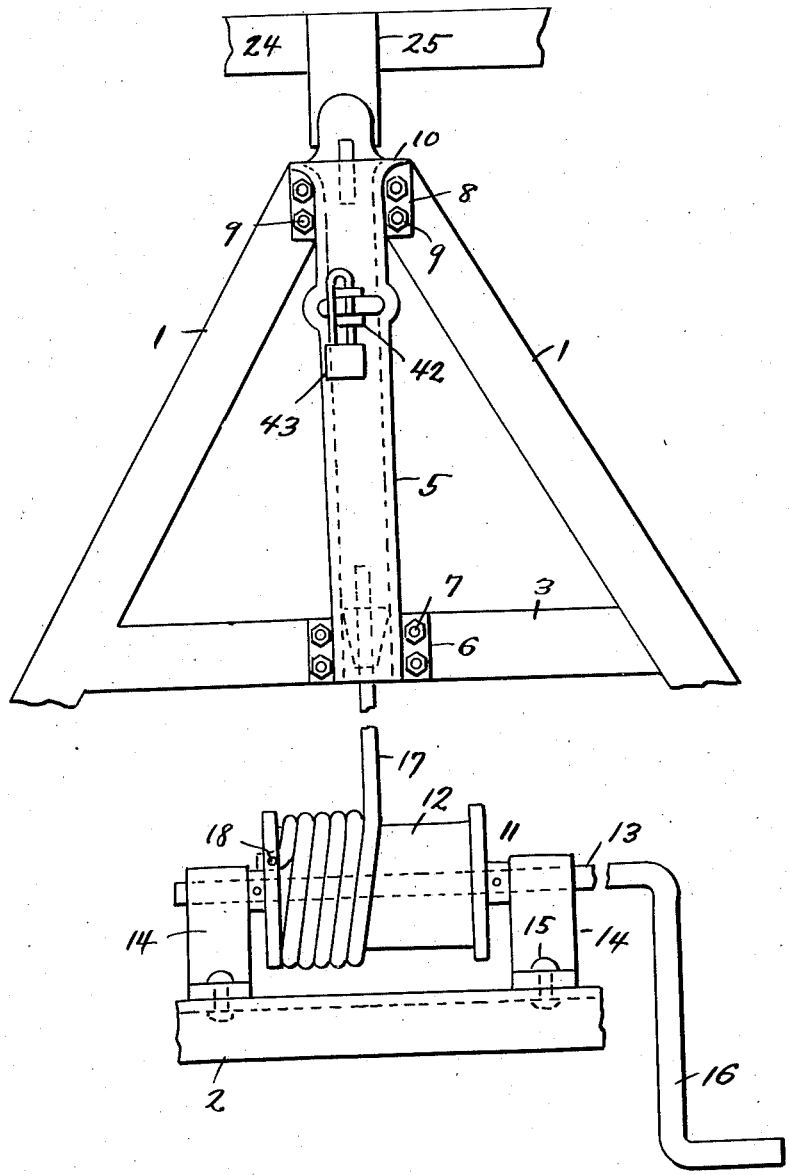

2,170,983

UNITED STATES PATENT OFFICE 2,170,983

TRAILER HITCH

Schalto E. Adams, Flint, Mich., assignor of one-half to Clarence E. Dues, Flint, Mich.

Application April 2, 1938, Serial No. 199,710

2 Claims. (Cl. 280—33.15)

My invention relates to improvements in trailer hitches for use more particularly on heavy trailers such as cabin and house trailers, although, as will presently appear, it may be used to equal advantage on light trailers of any type.

The principal object of the invention is to provide a simplified, inexpensive trailer hitch obviating completely manipulation of the trailer by hand either preparatory to or incident to hitching the same and reducing the number of hitch parts to be carried by the tow car to a single small and inconspicuous unit.

Another object is to provide a hitch of the character and for the purpose above set forth which eliminates transmission of torque from the trailer to the tow car and which is adapted to be locked to prevent unauthorized use of the trailer.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a fragmentary view in top plan of the preferred embodiment of my invention, Figure 2 is a view in horizontal section of the coupling bar, Figure 3 is a view in top plan of said bar, Figure 4 is a view in longitudinal section taken on the line 4—4 of Figure 3, Figure 5 is a view in side elevation of the locking yoke, Figure 6 is a view in horizontal section of the coupling sleeve, and Figure 7 is a view in longitudinal section of said sleeve taken on the line 7—7 of Figure 6 looking in the direction indicated by the arrows.

Referring to the drawings by numerals, the hitch of my invention comprises a pair of reach bars 1 extending forwardly from the trailer frame, represented at 2, in converging relation and connected together intermediate the ends thereof by a cross bar 3, the bars 1 and 3 forming a rigid part of the trailer frame, if a two wheeled trailer, and being attached to the front axle in any suitable manner in the case of a four wheeled trailer.

Extending forwardly from the cross bar 3 to the outer ends of the bars 1 is a coupling sleeve 4 of cylindrical form having a pair of lateral rear end flanges 6 bolted to the cross bar 3, as at 7, to secure the rear end of the sleeve to said bar in the center thereof and also having a pair of front end lateral flanges 8 bolted, as at 9, to the front ends of the bars 1 and securing said ends in fixed relation. The front end of the sleeve 5 is bell-mouthed, as at 10, for a purpose presently seen.

Mounted on any suitable part of the trailer, as for instance frame 2, is a windlass 11 including a drum 12 fast upon a crank shaft 13, the latter journalled in a pair of brackets 14 suitably secured to the frame 2, as at 15, said shaft 13 having a crank part 16 adapted to be located preferably at one side of the trailer for convenient manipulation to rotate the drum 12. The drum 12 is adapted to wind up a cable 17 having one end suitably affixed to said drum, as at 18, and its other end extended into the coupling sleeve 5. Said other end of the cable 17 is secured in a bore 19 provided in the rear end of a coupling bar 20 adapted to fit part way into the sleeve 5. A stud 21 threaded into the coupling bar 20 against the cable 17 secures the latter in said bar.

The coupling bar 20 is adapted to be drawn into the coupling sleeve 5 by winding of the cable 17, for a purpose presently explained, and by way of the front end of said sleeve. To facilitate entrance of said bar into said sleeve, the bar is provided with a tapered rear end, as at 22 for co-operation with the bell-mouth 10 of the sleeve.

A lateral flange 23 adjacent the front end of the coupling bar 20 limits movement of said bar into the sleeve 5. The front end of the coupling bar 20 is coupled to the tow car, the rear end of which is represented at 24, by the following means. Said rear end of the tow car has mounted, in a bracket 25 extending therefrom, a vertically disposed stud 26 having a spherical head 27, a shank 28 threaded into said bracket, and a shoulder 29 below the head 27 limiting movement of the stud into said bracket. The front end of the coupling bar 20 has an axial bore 30 therein and a key hole slot 31 extending longitudinally in one side thereof and communicating with said bore. The bore 30 is closed at the front end thereof by a screw plug 32 locked by a set screw 33. The head 27 of the stud 26 is adapted to fit into the larger end of the key hole slot 31 and the shank 28 into the narrow part of said slot whereby the front end of the coupling bar 20 may be hooked over said head 27 and slid rearwardly thereon to locate said head in the bore against the plug 32 thereby coupling said bar 20 to the stud 26. The coupling bar 20 is latched in the described coupled position by means of the following. The bar 20 is provided in the side thereof opposite the slot 31 with a longitudinal slot 34 communicating with and in the rear of the bore 30. A latch member 35 is pivoted in said slot 34, as at 36, for swinging movement into and out of said slot 34 into latching and unlatching positions respectively. The latch member 35 has a right angled abutment end 37 adapted in the latching position of said member to be interposed between the pivot 36 and the rear end of the bore 30 behind the head 27 of stud 26 whereby rearward movement of the stud relative to the bar 20 is blocked and consequently uncoupling of the bar 20 prevented. The member 35 has a hand grip part 38 extending out of the slot 34, for manipulation of said member, and adapted to coact with the bell-mouth 10 of the sleeve 5 in the limit of movement of the bar 20 into the sleeve 5 to thereby block unlatching movement of said member.

The coupling bar 20 is adapted to be locked in the coupling sleeve 5. For this purpose said bar 20 is provided at a suitable intermediate point thereon with a concave transversely extending groove 39 therein adapted, in the limit of movement of the said bar 20 in the said sleeve 5 to register with a pair of apertures 40 provided in said sleeve 5 upon opposite sides of the bore thereof, said apertures 40, as will be understood, extending vertically and opening on top of said sleeve. A staple-like locking yoke 41 is provided for insertion into the apertures 40 and groove 39 in spanning relation to the latter whereby, as will be clear, the coupling bar 20 is rendered immovable in the coupling sleeve 5. The coupling sleeve 5 has formed on top thereof a pair of apertured ears 42 between which the yoke 41 is inserted and which are designed to accommodate a padlock 43 locking the yoke 41 in position.

In the use of the described invention, the coupling bar 20 is coupled to the stud 26 in the manner already described, and drawn into the coupling sleeve 5 by means of the windlass 11 to the limit of its movement therein. During the described drawing of the coupling bar into the coupling sleeve 5, the trailer is pulled up to the tow car in proper relation thereto all without manipulation of the trailer in any way whatever. In the limit of movement of the coupling bar 20 in the coupling sleeve 5 the locking yoke 41 is inserted in position and locked against removal all in a manner which has been described and need not again be referred to.

My invention will, it is believed, be readily understood from the foregoing without further explanation.

Manifestly the invention, as described, is susceptible of modification without departing from the inventive concept and right is herein reserved to such modifications as fall within the scope of the subjoined claims.

What I claim is:

1. In a hitch for coupling a trailer to a tow car, a sleeve extending forwardly from the trailer and fixed thereto, a vertically disposed stud on the rear end of the tow car, a coupling bar endwise slidable in the sleeve, means on one end of the coupling bar for coupling the same to said stud, means for moving the bar endwise inwardly of the sleeve means to lock the coupling bar to the sleeve against endwise movement including a staple-like locking member adapted for insertion into said sleeve in straddling relation to said bar, said sleeve having sockets therein for receiving said member, and the bar being grooved to interlock with said member, a pair of lugs on the sleeve for receiving the locking member therebetween, and a lock for bridging said lugs.

2. In a hitch for coupling a trailer to a tow car, a sleeve extending forwardly from said trailer and fixed thereto, a vertically disposed stud on the rear end of the tow car, a coupling bar endwise slidable in the sleeve, means on one end of the coupling bar for coupling the same to said stud, means for moving the bar endwise inwardly of the sleeve comprising a windlass mounted on the trailer and having a cable wound thereon and connected to the other end of the bar, and means to lock the coupling bar against uncoupling from said stud including a ball on the stud, a keyhole slot in said sleeve for receiving said ball and stud, and means to block removal of the ball from said slot operative by contact with one end of the sleeve under endwise sliding of said bar into said sleeve.

SCHALTO E. ADAMS.